Aug. 27, 1929.

E. HALLOWELL 1,725,914

DEVICE FOR PROPELLING AIRCRAFT AT HIGH
ALTITUDES BY DIRECT FLUID REACTION

Filed Aug. 1, 1928

Witness.
J. Hyett.

Inventor.
Edison Hallowell,
Per William E. P. Bagly.
His Attorney.

Patented Aug. 27, 1929.

1,725,914

UNITED STATES PATENT OFFICE.

EDISON HALLOWELL, OF HORSFORTH, NEAR LEEDS, ENGLAND.

DEVICE FOR PROPELLING AIRCRAFT AT HIGH ALTITUDES BY DIRECT FLUID REACTION.

Application filed August 1, 1928, Serial No. 296,759, and in Great Britain August 19, 1927.

This invention relates to devices of the kind in which the combustion of a suitable fuel is used to produce a gaseous stream for propelling purposes. For example, such devices have been suggested for use on aircraft in which case the gaseous stream is discharged into atmosphere to cause by reaction the propulsion of the aircraft. In one prior proposal a gaseous stream is discharged from a combustion chamber at atmospheric pressure into tubes having open ends. The cooling and contraction of the stream it is stated causes air to be introduced at one end of the said tubes and discharged at the other end. It is proposed to supply air to the combustion chamber by means of a fan or suitable collector or deflector, and petrol issuing from a nozzle may be used to draw in the air. In another prior proposal the gaseous stream is discharged at high pressure from a combustion chamber into a tube having an open end, and on issuing is allowed to expand in the said tube the diameter of which increases towards the outlet or discharging end. The expansion it is stated causes air to be introduced through the said open end, to mix with the gaseous stream and by means of a series of baffle plates the speed of the stream is diminished and the mass augmented.

The present invention is constructed in a manner suitable for efficiently propelling aircraft at high velocity through the rarefied air at high altitudes and is adjustable in order to work efficiently under different conditions of velocity or atmospheric pressure.

According to my invention the velocity of the air due to the motion of the aircraft is utilized to set up an increased pressure in a combustion chamber by means of an opening in the form of a converging conduit facing the direction of flight. This pressure is augmented by discharging into the said opening the fuel in the form of a gas at atmospheric pressure but at a velocity higher than the air, this gas mingling with and increasing the velocity of the air. Combustion of the gases takes place in the combustion chamber at an increased pressure due to the velocity of the incoming gases being reduced and thereby converted into pressure. After combustion the gases are discharged rearwards direct into the atmosphere through an opening in the form of a diverging conduit, issuing at atmospheric pressure but at high velocity, thereby converting heat into kinetic energy. Owing to the ratio of inlet velocity to outlet velocity being less than the ratio of the volume of the incoming cold gases to the outgoing hot gases the area of the discharge opening is greater than that of the inlet opening, and consequently because of the unbalanced pressures in the combustion chamber a thrust is set up in the direction of flight. Inside the combustion chamber is a smaller auxiliary combustion chamber in which a small proportion of the incoming gases are burnt for the purpose of preheating the remainder of the gases before combustion as it has been found that until a very high altitude is reached combustion will not take place at a sufficiently high velocity without preheating. At very high altitudes the heat due to the compressing of the incoming air is sufficient to preheat the gases. The auxiliary combustion chamber is supplied with an independent supply of fuel so that combustion may occur when the main fuel supply is discontinued. The velocity of the gases through this chamber is less than that of the main combustion chamber in order that the combustion may occur without preheating. The converging inlet conduit is provided with an adjustable device by means of which the extent of convergence may be varied from zero upwards to suit the atmospheric pressure and velocity of the aircraft in order to obtain a maximum pressure in the combustion chamber with a minimum of resistance to flight. For example it has been found that air can not be made to pass through a parallel conduit at above a certain velocity and if this velocity is exceeded a converging conduit is used which causes the air to be increased in pressure at its smaller end, thereby enabling a greater weight of air to pass into the combustion chamber and at the same time increasing the pressure in the combustion chamber. The diverging discharge conduit is also provided with an adjustable device by means of which the extent of divergence may be varied from zero upwards to suit the ratio of combustion chamber pressure to the pressure outside the said opening in order to fully expand and obtain the maximum velocity in the discharged gases, and the maximum thrust in the direction of flight. In the case of each of the said conduits the extent of convergence or divergence as the case may be is increased as the atmospheric pressure decreases and the velocity of flight increases the convergence or divergence being zero when the conditions are such that the ratio of combustion chamber pressure to pressure outside the discharge opening is less than 1.89 to 1. The thermal efficiency of the device increases with increase of the said ratio of pressures, therefore the device works most efficiently at very high altitudes as owing to the low air density the velocity of flight necessary to set up a high ratio of pressures can be more easily attained and also the kinetic energy of the discharged gases can be more fully utilized in propelling the aircraft at high speed. Any suitable fuel may be used for the combustible charge, for example liquid hydrogen, petrol, or crude oil the fuel being gasified by passing through a tubular vaporizer at high pressure the said vaporizer passing through the combustion chamber where it is arranged so as to serve the additional purpose of providing internal mechanical bracing for the combustion chamber. The heated high pressure gases are discharged from a diverging nozzle in which they are fully expanded and heat energy is converted into kinetic energy.

The external shape of the device may be similar to that of an aerofoil so as to serve the dual purpose of propelling and sustaining the aircraft.

In order that the said invention may be clearly understood and readily carried into effect, the same will now be described more fully with reference to the accompanying drawings in which:—

Figure 1:
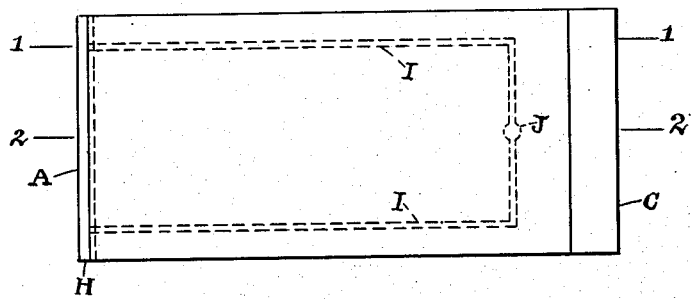
Fig. 1 is a plan of one embodiment of the invention.
Figure 2:
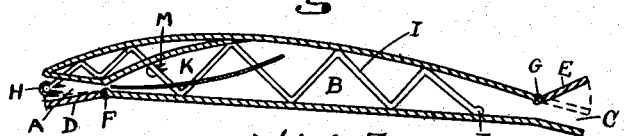
Fig. 2 is a section through the line 1—1.
Figure 3:
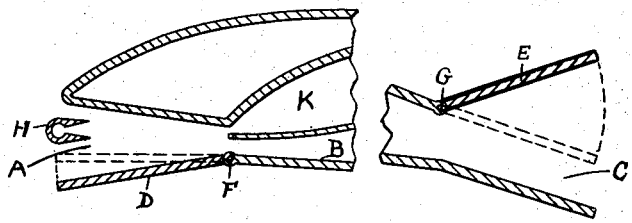
Fig. 3 is an enlarged section of the inlet and discharge openings through the line 2—2.
Figure 4:
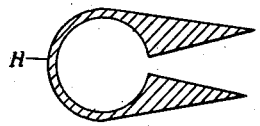
Fig. 4 is a section of the gaseous fuel nozzle.

In the example illustrated the device is fitted to an aircraft with the inlet conduit "A" facing the direction of flight. High pressure fuel is supplied through the tube "J" and passes through the vaporizer "I" enclosed in the combustion chamber, in which it is heated and gasified and then discharged from the diverging nozzle "H", being fully expanded and discharged at high velocity into the inlet conduit "A" into which is also passing air at the velocity due to flight. The gaseous fuel mixes with the air and increases its velocity, the mixed gases passing partly into the main combustion chamber "B" and partly into the auxiliary combustion chamber "K". Owing to the cross sectionl area of these chambers being greater than that of the inlet conduit the velocity of the gases is reduced thereby setting up an increased pressure. Only a small proportion of the gases pass through the auxiliary combustion chamber and the gas velocity is lower than is the case in the main combustion chamber, the object being to make combustion possible in this chamber without preheating of the gases. After combustion in the auxiliary combustion chamber the hot gases are discharged into the main chamber thereby heating up the incoming cold gases and accelerating combustion. A separate fuel supply is given to the auxiliary combustion chamber through the tube "M" for use when the main supply is discontinued. The whole of the heated gases are discharged from the discharge conduit "C" in which they are fully expanded and discharged at high velocity. The inlet and discharge conduits are provided with adjustable extensions "D" and "E" pivoted at the points "F" and "G" for the purpose of varying the extent of convergence or divergence respectively to suit the altitude and speed at which the aircraft is desired to fly. In Fig. 2 the arrangement of vaporizer tubes is shown the object of which is to provide internal mechanical bracing to counteract the pressure set up in the combustion chamber. In Fig. 2 is shown the cross sectional shape of the device which is similar to that of an aerofoil or aeroplane wing so as to serve the purpose of sustaining as well as propelling the aircraft. The device may be constructed of steel or aluminium alloy lined with asbestos or other refractory material. The aircraft to which the device is fitted may be raised to a high altitude by other means of propulsion as the device would work inefficiently at low altitudes. The inlet and discharge openings are firstly set at zero that is to say they are parallel until the velocity of the aircraft and the altitude is such that the ratio of combustion chamber pressure to pressure outside the discharge opening reaches a maximum figure and ceases to rise further. The extent of convergence in the inlet conduit and divergence in the discharge conduit is then gradually increased thereby causing the velocity and altitude of the aircraft to increase until finally the velocity of the aircraft is almost equal to the velocity of the discharged gases. If desired the fuel supply may be reduced in pressure as the altitude increases as the accelerating effect of the high velocity gaseous fuel is only required when the velocity of the aircraft is insufficient to set up the required pressure in the combustion chamber. When this velocity is exceeded the main fuel supply may be discontinued and fuel admitted only to the auxiliary combustion chamber, thereby increasing the thermal efficiency of the device.

It will be understood that the example above described and illustrated in the drawing is purely diagrammatic and only intended to show one mode of carrying the invention into effect. Several changes and modifications may be effected for instance it may be desirable to further increase the pressure in the combustion chamber by any suitable or convenient means for example air or other gaseous fluid may be discharged at high velocity into the inlet conduit or a fan or other compressing device may be used. Furthermore the arrangement for varying the extent of convergence or divergence in the inlet and discharge conduits respectively may be of any suitable or convenient kind, or the relative sectional area of the conduits may be variable. The preheating of the cold gases may be carried out in any suitable or convenient manner, for example any known form of heat exchanger may be employed. The fuel may be vaporized in any suitable or convenient manner and the device may be of any suitable or convenient external or internal shape or constructed of any suitable or convenient materials.

I claim:

1. A device for propelling aircraft at high altitudes by direct fluid reaction, comprising a variable converging inlet conduit, a combustion chamber integral with said conduit, means for discharge of combustible fluid into said combustion chamber and a variable diverging outlet conduit from which the heated gases are discharged.

2. A device for propelling aircraft at high altitudes by direct fluid reaction comprising a variable converging inlet conduit, a combustion chamber integral with said conduit through which air at the velocity due to flight enters means for the discharge of combustible fluid into said combustion chamber and a variable diverging outlet conduit of a greater cross sectional area than the inlet from which the heated gases are discharged.

3. A device for propelling aircraft at high altitudes by direct fluid reaction comprising a variable converging inlet conduit, a combustion chamber integral with said conduit in which combustion takes place under the pressure set up by the incoming air, means for discharge of combustible fluid into said combustion chamber and a variable diverging conduit of greater cross sectional area than the inlet from which the heated gases are discharged at increased velocity and heat is converted into kinetic energy.

4. A device for propelling aircraft at high altitudes by direct fluid reaction comprising a variable converging inlet conduit, a combustion chamber integral with said conduit through which air at the velocity due to flight enters, a diverging nozzle for the discharge of gaseous fluid into said inlet conduit, and a variable diverging discharge conduit of greater cross sectional area than the inlet from which the heated gases are discharged at increased velocity and heat is converted into kinetic energy.

5. A device for propelling aircraft at high altitudes by direct fluid reaction, comprising a variable converging inlet, a diverging nozzle for the discharge of gaseous fluid into said inlet, a combustion chamber integral with said inlet in which combustion takes place under the pressure set up by the incoming air and a variable diverging discharge conduit of greater cross sectional area than said inlet from which the heated gases are discharged.

6. A device for propelling aircraft at high altitudes by direct fluid reaction comprising a variable converging inlet, a diverging nozzle for the discharge of gaseous fluid at atmospheric pressure and high velocity into said inlet, a combustion chamber integral with said inlet, an auxiliary combustion chamber provided within said combustion chamber from which the products of combustion are discharged into the main chamber and a variable diverging discharge conduit of greater cross sectional area than the inlet from which the heated gases are discharged.

7. A device for propelling aircraft at high altitudes by direct fluid reaction comprising a variable converging inlet, a diverging nozzle for the discharge of gaseous fluid at atmospheric pressure and high velocity into said inlet, a combustion chamber integral with said inlet, an auxiliary combustion chamber provided within said combustion chamber from which the products of combustion are discharged into the main chamber, vaporizer tubes connected to said nozzle for the combustible fluid, a mechanical bracing for the combustion chamber formed from said vaporizer tubes, and a variable diverging discharge outlet of greater cross sectional area than the inlet.

8. A device for propelling aircraft at high altitudes by direct fluid reaction having an external shape similar to that of an aerofoil comprising a variable converging inlet, a diverging nozzle for the discharge of gaseous fluid at atmospheric pressure and high velocity into said inlet, a combustion chamber integral with said inlet, an auxiliary combustion chamber provided within said combustion chamber from which the products of combustion are discharged into the main chamber, vaporizer tubes connected to said nozzle for the combustible fluid, a mechanical bracing for the combustion chamber formed from said vaporizer tubes, and a variable diverging discharge outlet of greater cross sectional area than the inlet.

In witness whereof I affix my signature.

EDISON HALLOWELL.